Figure 1:
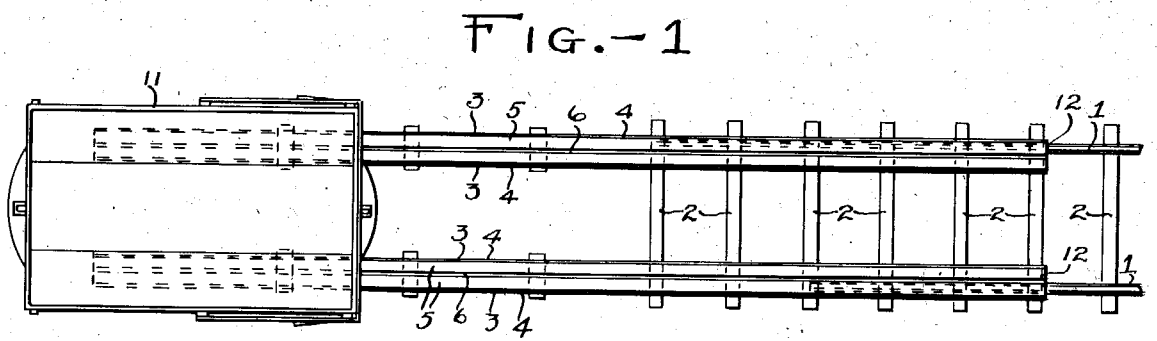

March 9, 1926. Re. 16,289

H. P. TOMPKINS

EXTENSION RAIL

Original Filed June 8, 1923 2 Sheets-Sheet 1

Inventor

Harold P. Tompkins,

By Bates, Macklin, Golrick & Teare Attorneys

March 9, 1926. Re. 16,289

H. P. TOMPKINS

EXTENSION RAIL

Original Filed June 8, 1923 2 Sheets-Sheet 2

Inventor

Harold P. Tompkins

By Bates, Macklin, Molrich & Teare Attorneys

Reissued Mar. 9, 1926. Re. 16,289

UNITED STATES PATENT OFFICE.

HAROLD P. TOMPKINS, OF CHARLESTON, WEST VIRGINIA.

EXTENSION RAIL.

Original No. 1,486,700, dated March 11, 1924, Serial No. 644,226, filed June 8, 1923. Application for reissue filed January 22, 1926. Serial No. 83,151.

*To all whom it may concern:*

Be it known that I, HAROLD P. TOMPKINS, a citizen of the United States, residing at Charleston, in the county of Kanawha and State of West Virginia, have invented new and useful Improvements in Extension Rails, of which the following is a full, clear, and exact description.

In mines, quarries and the like, the track rails for cars require frequent short extensions at the loading or working faces of the mines. The laying of these extension tracks not only requires considerable time and labor, but necessitates the use of other men known as a track laying crew, during corresponding idle time and sometimes a day or two of waiting on the part of the mining crew. It is, therefore, the principal object of this invention to provide simple, efficient and durable track extension rails, which may be operated so easily and simply that the miners may accomplish this extension by simply sliding my extension rails forwardly and the track crew need not be called upon until the advancement of the working space beyond the ends of the rails is sufficient for a whole new length of track rail. To accomplish this object it is necessary that the extension rails may be simply moved forwardly and slid along the track rails and rest upon the mine floor while the alignment is provided automatically. An object of the invention is therefore so to space the extension rails that they may engage and be acted upon by the flanges of the car wheels to be thereby gauged by actually sliding somewhat sideways, and may be held to the gauge while the car is riding thereover.

A further object of the invention is to so construct the extension rail that it may comprise in effect an inverted channel member, slidable over the track rail, and which may be capable of being easily produced of steel or the like by the usual methods. A specific object in this connection is to so shape the extension rail that it may present such a supporting surface to the floor of the mine as to readily find rigid support thereon, and a further object in connection with the shaping of the rail is to provide the greatest possible strength, commensurate with the desired light weight of the rail. Still another object is to so shape the extension rail that it may lower the car support below the level of the track rail, thus giving the greatest possible head room.

Figure 2:
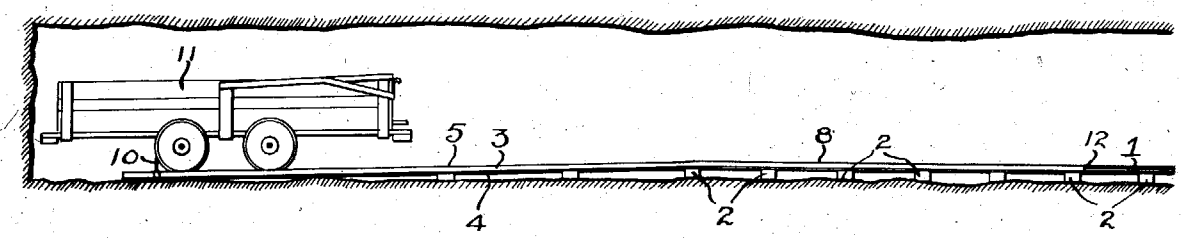
Figure 3:
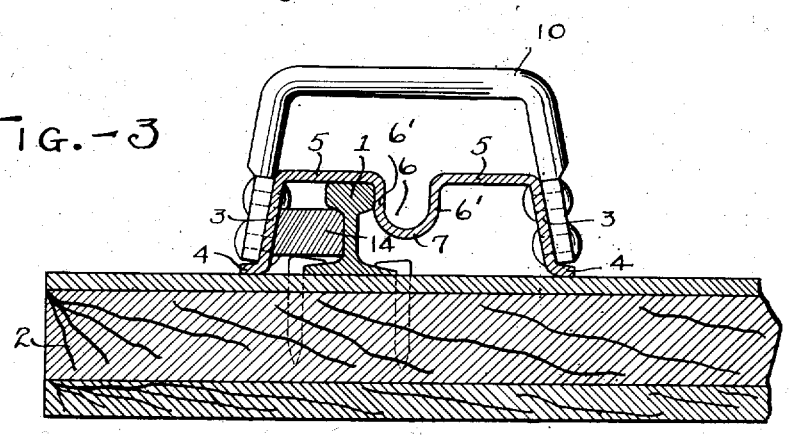
Figure 4:
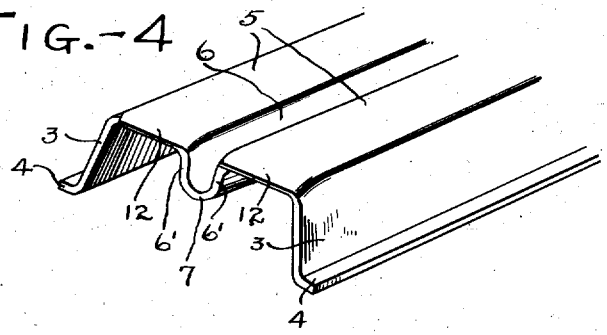
Figure 5:
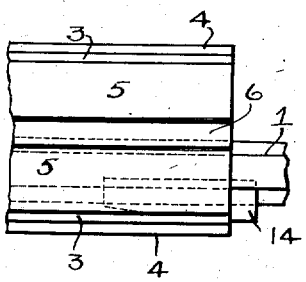

A preferred embodiment of my invention, accomplishing the above objects is shown in the accompanying drawings to which the following description relates. The essential characteristics of my invention are summarized in the claims, reference being had to the accompanying drawings:

Figure 1 is a top plan view illustrating the application of the improvement; Figure 2 is a side elevation thereof; Figure 3 is a greatly enlarged transverse sectional view through one of the extension rails in a line with the combined handle and stop thereon; Figure 4 is a perspective view of the end of one of the rails to more clearly illustrate the inclined or beveled corner thereon; Figure 5 is a fragmentary top plan view to more clearly illustrate the engagement of the wedge with the rail and the extension.

The rails constituting the track 1, in a mine or quarry are of the usual construction and are spiked to the ties 2.

When the face or working place of a mine or quarry has been cut away to require an extension of the mine track 1, it is ordinary practice to lay additional track on additional ties 2. These track extensions are connected to the ends of the main track rails by fish plates or analogous means and the track extensions are spiked to their ties. Especially in mines, where "head room" is small, the laying of such track extension is slow, laborious and dangerous, and to obviate such contingencies I provide a track projector or extension rail that comprises a pair of rail members of a peculiar construction but amply efficient for the purpose. Each of my improved rails is in the nature of a channeled member, shown as having outwardly inclined sides 3 that preferably have their lower edges bent outwardly to provide feet 4. The top 5 of each of the rails is preferably substantially flat and said top is of a width somewhat in excess of that of the heads of the rails of the track 1. The flat head 5 of my improved rail is shown centrally channeled, as at 6. This channel is provided by grooving the flat top 5 to provide the same with depending parallel walls 6′ and a lower rounded wall 7.

The portions of the rail extension 8 which rest on the main rails are preferably straight, and the portions that project beyond the ends of the said main rails are preferably inclined downwardly to rest on the floor of the mine or quarry. Adjacent their outer ends the rail members 8 have riveted or otherwise secured to their sides substantially U-shaped combined handle and car wheel stop members 10. The members 10 facilitate the handling of the rails 8.

With my improvement the extension rails are arranged over the heads of the rails of the main track so that the side walls 6′ of the extension rails will contact with the sides of the heads of the respective main rails. As either of the extension tracks may be arranged on either rail of the main track, it will be apparent that the flange of the wheel of the car 11 may travel over either portion of the head 5 at the opposite side of the groove of the rail, and consequently two car tread receiving surfaces are provided. When arranged on the rails the handles are grasped and the extension rails are slid outwardly from the main track to proper position with respect to the face or working place in a mine or quarry. The operator can, by his eye, determine if the ends of the extension rails are disposed opposite each other. The car 11 traveling toward the face or working place of the mine or quarry will travel off of the rails of the main track over the beveled ends 12 of the rail extensions and be guided thereby so that their wheel flanges will be received in the grooves 6 and their treads be delivered on to the flat top of the rail extensions. The movement of the car over the extension rails, in view of the contacting engagement of the wheel flanges with the walls of the said grooves will cause the extension rails to be properly gauged. As this action is automatic, its value will be appreciated to those skilled in the art to which this invention relates. The ends of the projecting rails will rest on the floor of the mine or quarry so that they will assume a downward inclination with respect to the rails of the main track and consequently afford more "head room" in a mine, the vertical crown or middle ordinate of the extension rail allowing the other end to fit snugly to the main track rail. The rail extensions, at suitable intervals from their lapping engagement with the rails of the main track may be braced by shale, rock, or other material disposed on the floor under the said rails. If desired, a wedge 14 may be inserted between the heads of the rails of the main track and the angle sides of the rails 8 adjacent thereto so that the inner ends of the rail extensions will be firmly connected to the rails of the main track.

With my improvement a track can be extended in a very short period of time and by a single hand, and no tools or securing means are required. This can be accomplished by an ordinary miner. Because of its width and the feet 4 on the sides thereof, the track extension will not sink into the floor to any comparative degree and any slight sinking will only serve to hold the rails of the said track extension in proper alignment. The rails 8 can be removed as easily as positioned, are interchangeable, can be used over and over indefinitely, over wood, steel or other kind of ties and on any size rails or gauge track.

My improved extension rail may be arranged upon either wooden or metal ties, and in Figure 3 of the drawings, the tie 2 has its central portion of wood and its upper face of metal and its lower face of wood. The sections are of different sizes. This, as a matter of fact, discloses three separate ties upon any one of which the main rails and the extension rails may be positioned.

Having decsribed the invention, I claim:

1. A car track extension for mines, quarries or the like, comprising a pair of channeled members each of a width materially greater than the cross sectional width of the heads of the mine car rails, and each centrally and longitudinally grooved to permit either of the side walls provided by the groove contacting the side of the car rail heads, and wedging means for holding the track extensions in such position.

2. An extension track for the car tracks of mines, quarries, etc., comprising a pair of similarly constructed rails, each comprising a cross sectionally U-shaped member having the edges of its sides bent outwardly to provide feet and each having its flat head centrally channeled longitudinally, each of said track extensions being of a materially greater width than the cross sectional width of the head of the mine car rails whereby either of the side walls provided by the groove in the track extensions will be brought next to the side of the said rails when the track extensions are arranged on the mine car rails, and means wedging the inner ends of the track extensions to the rails of the track.

3. In combination with a railway track, of an extension therefor, comprising a pair of similarly constructed rails each constituting a member which is substantially U-shaped in cross section, having its sides inclined outward and terminating in bent feet, the flat face of each rail extension being centrally channeled longitudinally, either of the side walls provided by the channel designed to contact with the side of the track rail head when arranged thereover, the sides of each of the track extensions being inclined, and a combined handle and car wheel stop secured to each of the track extension rails adjacent to the outer end thereof.

4. In combination with a railway track, of an extension therefor, comprising a pair of similarly constructed rails each constituting a member which is substantially U-shaped in cross section, having its sides inclined outward and terminating in bent feet, the flat face of each rail extension being centrally channeled longitudinally, either of the side walls provided by the channel designed to contact with the side of the track rail head when arranged thereover, the sides of each of the track extensions being inclined, and a substantially U-shaped member having its arms secured to the sides of the rail extensions adjacent to the outer end thereof and providing a combined handle and car wheel stop.

5. An extension for the tracks in mines, etc., comprising a pair of channeled members having inner straight portions to rest on the heads of the car rails and outer inclined portions to rest on the floor of the mine, and each of said rail extensions being centrally and longitudinally channeled to receive the flanges of car wheels therein.

6. An extension for the tracks in mines, etc., comprising a pair of channeled members having inner straight portions to rest on the heads of the car rails and outer portions to rest on the floor of the mine, and each of said rail extensions being longitudinally channeled to receive the flanges of car wheels therein.

7. The combination of a car track and extension members comprising a pair of channel members having tread portions adapted to rest on the heads of the car track rails, and integral depending flanges adapted to sustain the tread portions beyond the end of said car rails, said channel members having parallel spaced apart shoulders extending longitudinally thereof and adapted to engage the flanges of the car wheels to cause the gauging of the extension channel members.

8. The combination with a car track of an extension for the track, comprising a pair of channel members having tread portions adapted to rest on the heads of the car rails, and outer depending portions adapted to sustain the tread portions beyond the car track rails, and each of said channel members being longitudinally grooved to receive the flanges of car wheels to cause the lateral spacing or gauging of the overhanging or forwardly projecting portions of the channel members, said members being easily slidable along the track rails.

9. The combination with a track rail of an extension rail substantially wider than the track rail and having two tread portions either of which may rest upon the track rail, said tread portions being separated by a longitudinally extending channel depending between the tread portions and adapted to be engaged by the flanges of car wheels, and integral depending portions at the outer sides of the tread portions and adapted to rest upon the ground.

10. The combination with a track rail, of an extension rail of inverted U-shape having a span at least twice as great as that of the rail, the top portion of said extension rail being separated into two tread portions of equal width by a depending trough shaped portion adapted to receive the flange of the car wheel.

11. The combination with a track rail, of an extension rail of inverted U-shape having a span at least twice as great as that of the rail, and having an internal height substantially equal to that of the rail, the top portion of said extension rail being separated into two tread portions of equal width by a depending trough shaped portion adapted to receive the flange of the car wheel.

Signed at Charleston, West Virginia, this 19th day of January 1926.

HAROLD P. TOMPKINS.